US010243908B2

(12) United States Patent
Jones et al.

(10) Patent No.: US 10,243,908 B2
(45) Date of Patent: Mar. 26, 2019

(54) DYNAMIC COMMENT METHODS AND SYSTEMS

(71) Applicant: Bridgepoint Education, San Diego, CA (US)

(72) Inventors: Michael E. Jones, Poway, CA (US); Andrew McCann, Philadelphia, PA (US); Craig Gambino, San Diego, CA (US)

(73) Assignee: BRIDGEPOINT EDUCATION, San Diego, CA (US)

( * ) Notice: Subject to any disclaimer, the term of this patent is extended or adjusted under 35 U.S.C. 154(b) by 190 days.

(21) Appl. No.: 13/931,594

(22) Filed: Jun. 28, 2013

(65) Prior Publication Data

US 2015/0006646 A1 Jan. 1, 2015

(51) Int. Cl.
*H04L 12/58* (2006.01)

(52) U.S. Cl.
CPC .................................. *H04L 51/32* (2013.01)

(58) Field of Classification Search
CPC ....... H04L 51/32; H04L 12/585; G06Q 10/10; G06Q 10/107; G06F 17/2247
USPC ........................................................ 709/206
See application file for complete search history.

(56) References Cited

U.S. PATENT DOCUMENTS

| 9,460,140 | B2 * | 10/2016 | Morris | G06F 17/30867 |
|---|---|---|---|---|
| 2004/0030781 | A1 * | 2/2004 | Etesse | G06Q 30/06 |
| | | | | 709/225 |
| 2005/0081159 | A1 * | 4/2005 | Gupta | G06F 17/22 |
| | | | | 715/751 |
| 2005/0257134 | A1 * | 11/2005 | Goodman et al. | 715/507 |
| 2006/0129929 | A1 * | 6/2006 | Weber | G06F 17/246 |
| | | | | 715/267 |
| 2008/0141117 | A1 * | 6/2008 | King | G06F 17/30011 |
| | | | | 715/238 |
| 2008/0235677 | A1 * | 9/2008 | Aniszczyk | G06F 8/33 |
| | | | | 717/165 |
| 2009/0043814 | A1 * | 2/2009 | Faris et al. | 707/104.1 |
| 2011/0264694 | A1 * | 10/2011 | Rensburg | G06F 17/241 |
| | | | | 707/770 |
| 2012/0088217 | A1 * | 4/2012 | Freeman | G09B 7/00 |
| | | | | 434/350 |
| 2012/0110429 | A1 * | 5/2012 | Tzonis | G06Q 10/10 |
| | | | | 715/230 |
| 2012/0197980 | A1 * | 8/2012 | Terleski | G06Q 50/01 |
| | | | | 709/203 |

(Continued)

OTHER PUBLICATIONS

Patent Cooperation Treaty, International Search Report for PCT/US2014/040017, dated Oct. 16, 2014, pp. 1-2.

*Primary Examiner* — Michael A Keller
*Assistant Examiner* — Javier O Guzman
(74) *Attorney, Agent, or Firm* — Sheppard Mullin Richter & Hampton LLP

(57) ABSTRACT

Methods and systems of dynamic comment are provided. A comment library stores comment entries and provides a basis for determining comment selections dynamically. Metadata associated with the comment entries may also be stored in the comment library. A set of comment selections may be determined based on the context in which a user is commenting on the digital content and the user's input. A comment library may be searched for matching instances of the user's input to determine the set of comment selections.

13 Claims, 5 Drawing Sheets

(56) References Cited

U.S. PATENT DOCUMENTS

| | | | | |
|---|---|---|---|---|
| 2012/0254308 A1* | 10/2012 | Habib | G06Q 10/10 | |
| | | | 709/204 | |
| 2013/0339342 A1* | 12/2013 | Jain | G06F 17/30867 | |
| | | | 707/722 | |
| 2014/0028571 A1* | 1/2014 | St. Clair | G06F 3/0412 | |
| | | | 345/173 | |
| 2014/0040741 A1* | 2/2014 | van Os | G06F 3/0481 | |
| | | | 715/719 | |
| 2014/0173407 A1* | 6/2014 | Kruglick | G06F 17/276 | |
| | | | 715/226 | |
| 2014/0280195 A1* | 9/2014 | Etzioni | G06F 17/30997 | |
| | | | 707/741 | |

* cited by examiner

DYNAMIC COMMENT METHODS AND SYSTEMS

TECHNICAL FIELD

The present application relates generally to digital content, and some embodiments relate to methods and systems of commenting digital content dynamically.

DESCRIPTION OF THE RELATED ART

Driven by advances in computer networking and communication technologies, E-learning has become popular. Different types of digital media deliver text, audio, images, animation, and many other types of digital content to facilitate learning. Students may submit materials such as questions, homework, and/or exams for teachers or instructors to provide feedback. However, entering detailed feedback such as grading, comments, and/or explanations may be laborious, time consuming, and prone to errors, which may affect the efficiency and efficacy of E-learning.

BRIEF SUMMARY OF THE APPLICATION

According to various embodiments of the application, methods and systems of dynamic comment are provided. In various embodiments, a comment library stores comment entries and provides a basis for determining comment selections dynamically. Metadata associated with the comment entries may also be stored in the comment library. In various embodiments, the comment selections are determined based on the context in which a user is commenting on the digital content and the user's input, which may be monitored and used to determine comment selections.

A comment library may be searched for matching instances of the user's input to determine comment selections. The comment selections may be prioritized based on a usage weighting, a usage context, a keyword matching, or a full text search matching. A user may make a comment selection from the comment selections provided to use as a comment entry. The comment selection may be further edited or modified to create a comment entry. The comment library may be updated to include the comment entry. Furthermore, the comment entry may be associated with the context to update the search algorithm to learn frequency of use for the context.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Typos and errors such as spelling and grammatical errors are quite prevalent in feedback. Their occurrence may increase significantly when the process of providing feedback is tedious or there is time pressure or distractions. Entering repetitive information such as a frequently reference web link or URL into feedback is also time consuming and error prone. In addition, when feedback originates from multiple authors, consistent tone and content of the feedback are difficult to manage and maintain when new comments are created every time. More accurate and consistent feedback is assured by providing a comment library based on which comments may be created or entered dynamically, thus improving the overall E-learning experience.

Before describing the application in detail, it is useful to describe an example environment in which the application can be implemented. One such example is illustrated in FIG. 1.

Figure 1:
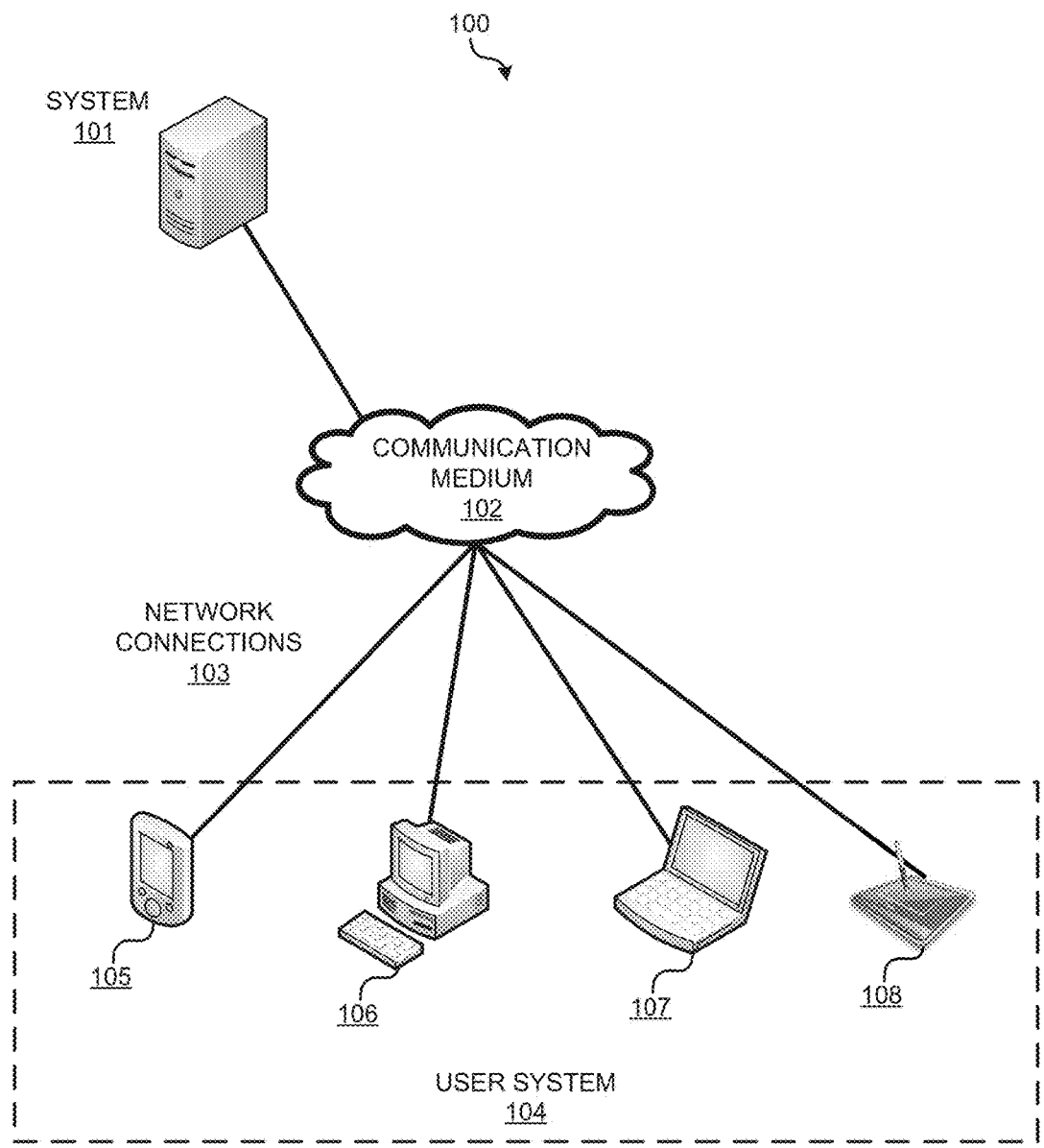
FIG. 1 illustrates an exemplary environment in which an embodiment may be implemented.

FIG. 1 illustrates an exemplary E-learning system 101 implemented in an environment 100 comprising various user devices 105-108, which may be collectively referred to as a user system 104 connected via a communication medium 102. The E-learning system 101 may provide E-learning services, and users may request and/or submit various digital content from the E-learning system 101 by using different user devices 105-108. In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, user system 104 may comprise a smartphone 105 (e.g., iPhone®), a personal computer 106, a laptop computer 107, and/or a tablet 108 (e.g., iPad®), through their respective network connections 103, can either interact directly or indirectly with E-learning system 101. For example, a network connection 103 may include wired connections (e.g., Digital Subscriber Line (DSL), optical) and/or wireless connections (e.g., Wi-Fi.) In various embodiments, a network connection 130 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 103 need not necessarily be the same throughout the environment 100. For example, as a smartphone moves throughout the environment, it could move from a WiFi network to a cellular data network, and could further move between various cells in a cellular data network. Various user devices 105, 106, 107, and 108 and the E-learning system 101 described herein may be implemented using the example computer system illustrated in FIG. 5.

A platform to provide feedback on digital content may be hosted by the E-learning system 101, which may be accessed by a user using any user device 105, 106, 107, or 108. In various embodiments, a user may access, stream, purchase, upload, grade, or provide feedback on a digital content via a user system 104. The user system 104 can display any interface related to the E-learning system 101. For example, the user system 104 may be configured to receive an input (or request) from a user, to transmit the input to the E-learning system 101, and to receive digital content from the E-learning system 101. In one embodiment, a user may download a client component of an E-learning system such as an E-learning app or application. The client component may be executed locally at a user system 104, whereas the E-learning system 101 may provide back-end support for the client component and may be responsible for maintaining the digital content, creating and maintaining a comment library, processing inputs from users, gathering user data, streaming digital content, and transmitting instructions to various user devices 105-108 of the user system 104.

Figure 2:
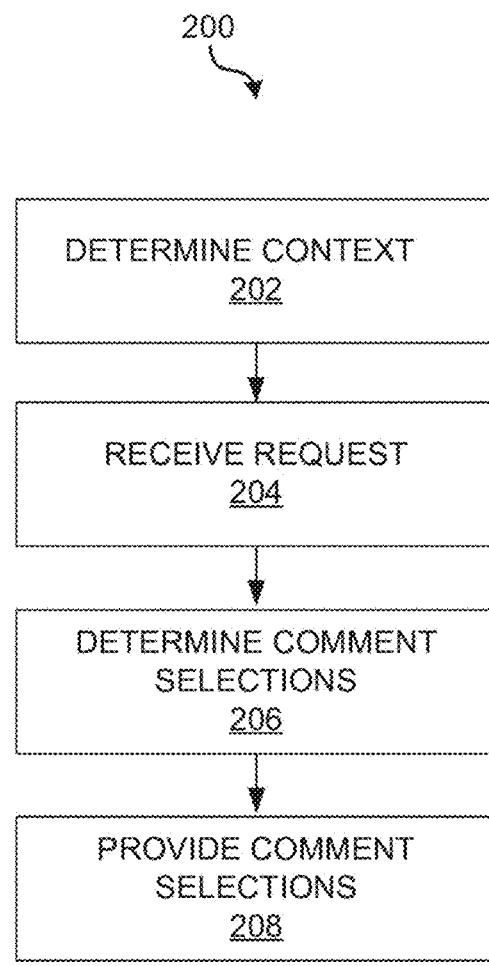
FIG. 2 is a flow diagram illustrating an exemplary method of creating dynamic comments in accordance with an embodiment.

FIG. 2 is a flow diagram illustrating an exemplary method 200 of creating dynamic comments, such as for the system 100 in FIG. 1. At step 202, a context in which a user is commenting on digital content is determined. For example, an instructor may use freeform text entry to comment on a digital document submitted by a student. Information relating to the context such as a user (e.g., a user name, an instructor, or a student), a course (e.g., algebra, philosophy I, and criminal law), a course section, an assignment (e.g., homework 1, mid-term, and final exam), a submission type (e.g., multiple choice of mid-term, essay I of mid-term, essay II of mid-term), or a comment library preference (e.g., public or private comment library) may be collected to determine the context in which the user is commenting on the digital content. Various embodiments may collect different information to determine a context. Comments stored in a public library are available to all users of an E-learning system whereas comments stored in a private comment library are only available to users identified in the private comment library.

In various embodiments, the context of the digital content being commented on and the context of the user making comments may determine a set of appropriate comment libraries from which a set of comment selections may be determined. For example, the comment libraries Chemistry, Final Exam, and Instructor Whyte may be the appropriate comment libraries when answers to a chemistry final exam are graded. In some embodiments, a set of comment search filters is generated and maintained based on the context in which the user comments on the digital content. The comment search filters may determine a subset of comments of the comment libraries to be searched. The set of comment search filters may be relevant to the context and constantly adjusted. In some embodiments, a user may specify the comment libraries to be searched. In further embodiments, the comment libraries to be searched may be determined to be the set of comment libraries used previously in a similar context.

In various embodiments, the digital content on which the user is commenting is displayed. At step 202, a request to create a comment from the user is received. A comment may be an answer to a question, an explanation to a solution, an explanation of a model answer, grading an exam, or other feedback provided by a user (e.g., an instructor, a teaching assistant) to another user (e.g., a student, another instructor, a teaching assistant). In one embodiment, a request is received when a user initiates freeform text entry. In other words, when a user starts to type, the user's request to create a comment is received.

At step 204, a set of comment selections is determined. The set of comment selections may be related to the input of the user and the context in which the user is commenting on the digital content. In some embodiments, the user-entered text is used to search the set of comment libraries dynamically. In various embodiments, a user's input is monitored. As such, the comment libraries are dynamically searched using the text entered while the user is entering the text. In one embodiment, a user's pressing of a key is monitored and the set of comment libraries are searched using the entered text after each keystroke. In further embodiments, the set of comment libraries is searched for keywords and full text matches. Comments of a public comment library may be included in the set of comment selections as an option. Comments of a private comment may be included in the set of comment selections and may be modified by the user at any time.

A user's input may be monitored. When the user's input matches a predetermined input, a new search may be initiated. The comment selections resulting from the new search may be based on the user's input after the predetermined input is detected. In one embodiment, the predetermined input is the "enter" key. Each new line entered during a freeform comment entry process may reset the search parameters and refresh a search result of comment selections. At step 206, the set of comment selections resulting from the search are provided to the user. A user may make a comment selection from the set of comment selections provided.

Figure 3:
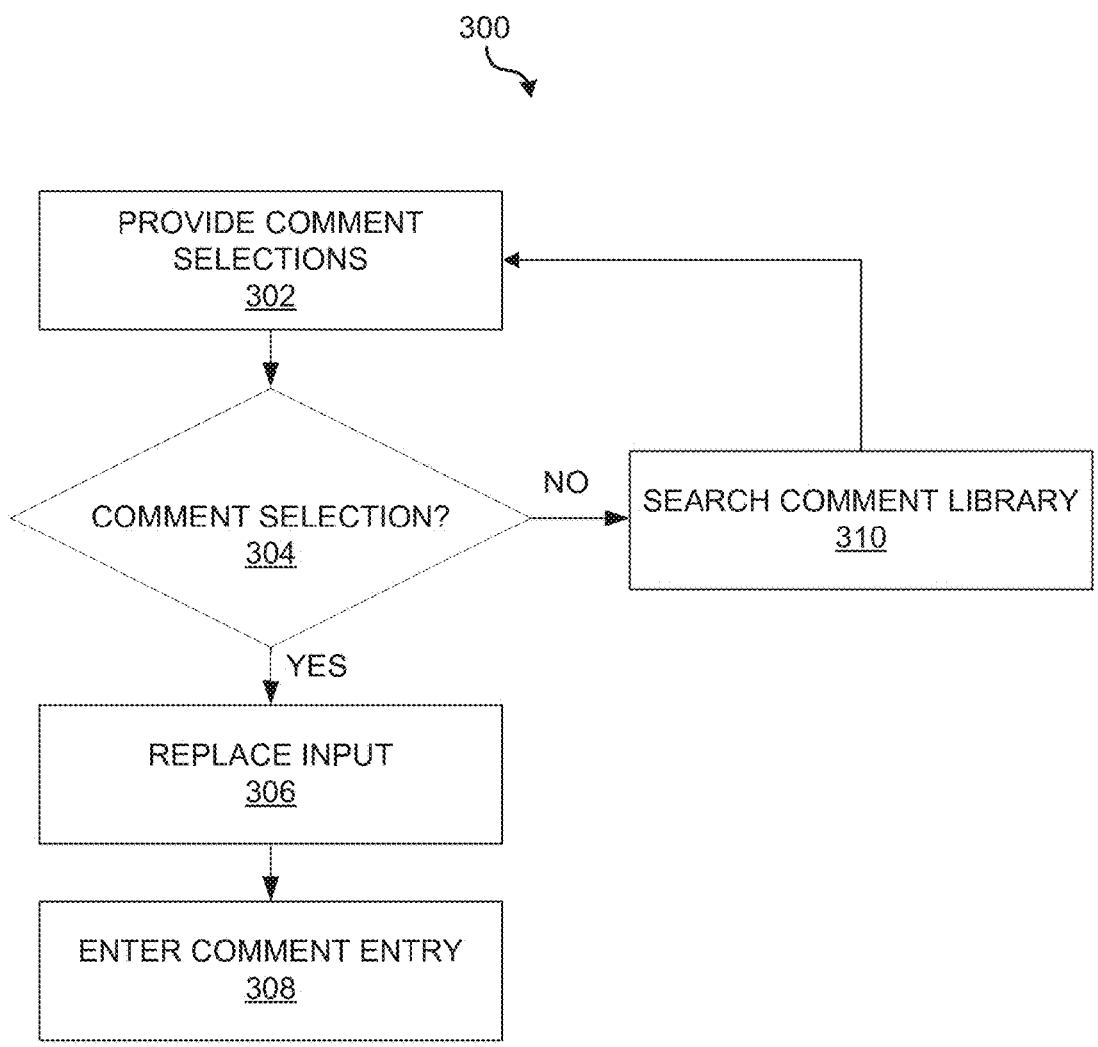
FIG. 3 is a flow diagram illustrating an exemplary method of creating dynamic comments in accordance with an embodiment.

FIG. 3 is a flow diagram illustrating an exemplary method 300 of creating dynamic comments, such as for the system 100 in FIG. 1. At step 302, a set of comment selections is provided to a user. The set of comment selections may be prioritized based on the user's input and the context in which the user is commenting on the digital content. In various embodiments, the set of comment selections is sorted by history of usage (e.g., usage weighting, usage context, keyword matching, or full text matching). In one embodiment, the most commonly used comment selection is first provided to the user. In another embodiment, the most recently used comment selection is first provided to the user. In a further embodiment, the comment selection with the most closely matched keyword is first provided to the user. In yet a further embodiment, the comment selection with the most closely matched full text is first provided to the user.

At step 304, whether a user makes a comment selection from the set of comment selections is determined. Upon receiving a comment selection from the set of comment selections from the user, at step 306, the comment selection made by the user replaces the user's input based on which the set of comment selections are provided. In other words, the user's input that results in the set of comment selections is replaced with the comment selection chosen by the user.

In various embodiments, the comment selection made by the user may be associated with the context in which the user is providing feedback. As such, the frequency of use of a comment in a context or in a library may be determined and may provide a basis for future comment selection determinations. In one embodiment, the paragraph in the comment entry entered by the user is replaced by the comment selection.

At step 308, a comment entry is entered. In various embodiments, the comment selection is modified or entered to form a comment entry. In some embodiments, the comment entry is added to a comment library for future searches. Metadata may be associated with and stored along with the comment entry. The metadata may be the context information based on which the comment selection is searched. The metadata may provide specific keywords for more accurate searching. The metadata may also provide shortcuts such as a keyword entry for future uses. In various embodiments, the comment entry is associated with the digital comment. The comment entry along with the digital content may be displayed to the user. The user may notify the intended recipient (i.e., another user) of the comment entry and the comment entry along with the digital content may be displayed to the intended recipient of the comment entry. The intended recipient may be notified via emails, e-learning system alerts, text messages, or other types of notifications.

If a user makes no comment selection at step 304, the search in the comment library continues at step 310. The comment selections resulting from the search are provided to the user at step 302. In various embodiments, the comment selections dynamically change as a user continuously updates his or her input.

Figure 4:
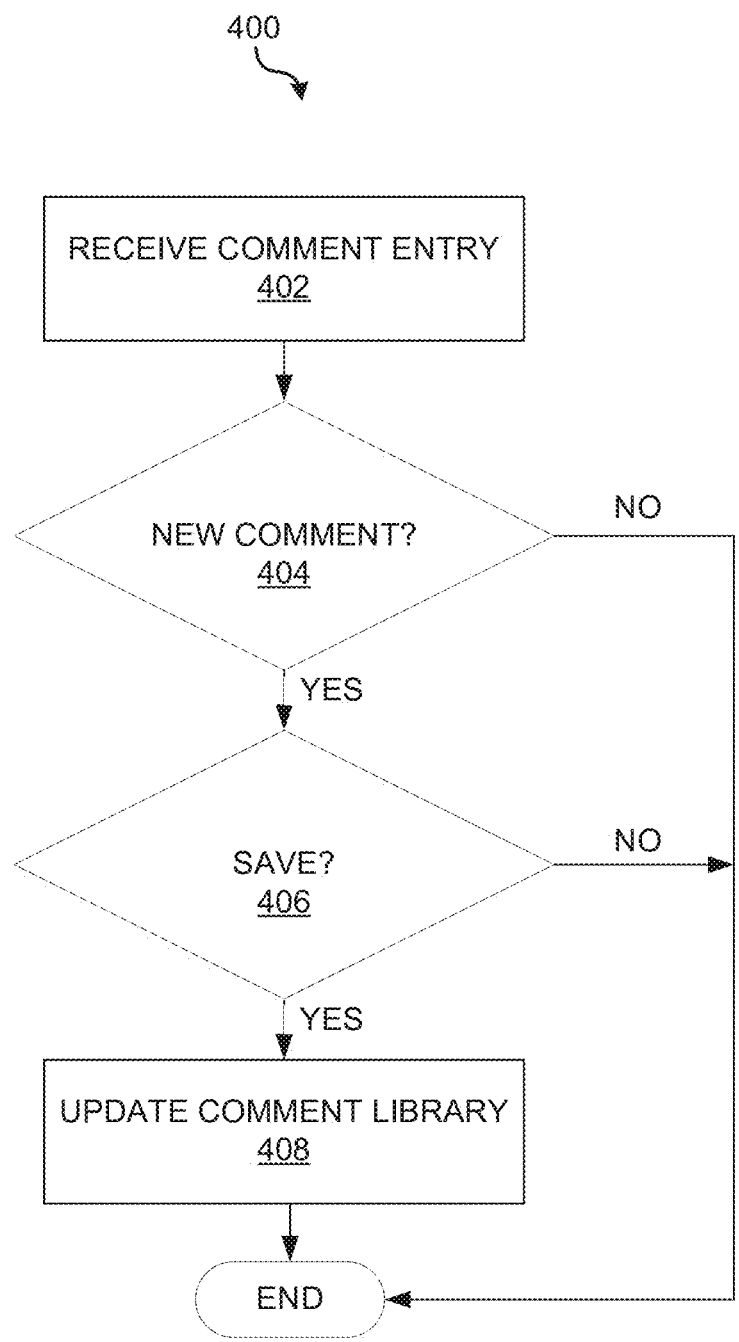
FIG. 4 is a flow diagram illustrating an exemplary method of updating a comment library in accordance with an embodiment.

FIG. 4 is a flow diagram illustrating an exemplary method 400 of updating a comment library, such as for the system 100 in FIG. 1. A comment entry is received at step 402. In various embodiments, a comment entry is received when the user's input is detected to be a predetermined input. For example, when a user presses the "enter" key, a comment entry is received. Step 404 entails determining whether a comment entry is a new comment. A new comment may be a freeform entry, or a comment selection modified by a user. An unmodified comment selection is not a new comment because of its existence in a comment library. In various embodiments, only new comments can be saved. An option to save a comment may be provided to the user subsequent to determining that a comment is a new comment. The option to save a comment may be provided during the feedback composition process. Subsequently, step 406 involves determining whether a comment entry is requested to be saved. A user may specify the comment libraries where the comment entry is saved.

Subsequently, at step 408, a comment library is updated to include the comment. In various embodiments, the context in which the comment is created is associated with and saved along with the comment. Metadata may be saved with the comment. Exemplary metadata includes the user, the course, the course section, the assignment, or the submission type. The metadata may support future contextual searches. Additional metadata may be added to the comment. For example, a specific keyword may be added to provide more accurate searching, or shortcuts may be added to support keyword entry in the comment entry process. A saved comment in a comment library may be shared with other comment libraries.

A person having ordinary skill in the art would appreciate that the E-learning system and the associated examples described above are for illustration purposes only, and the dynamic comment methods and systems described herein may be applied in cases where feedback to digital content is needed.

Figure 5:
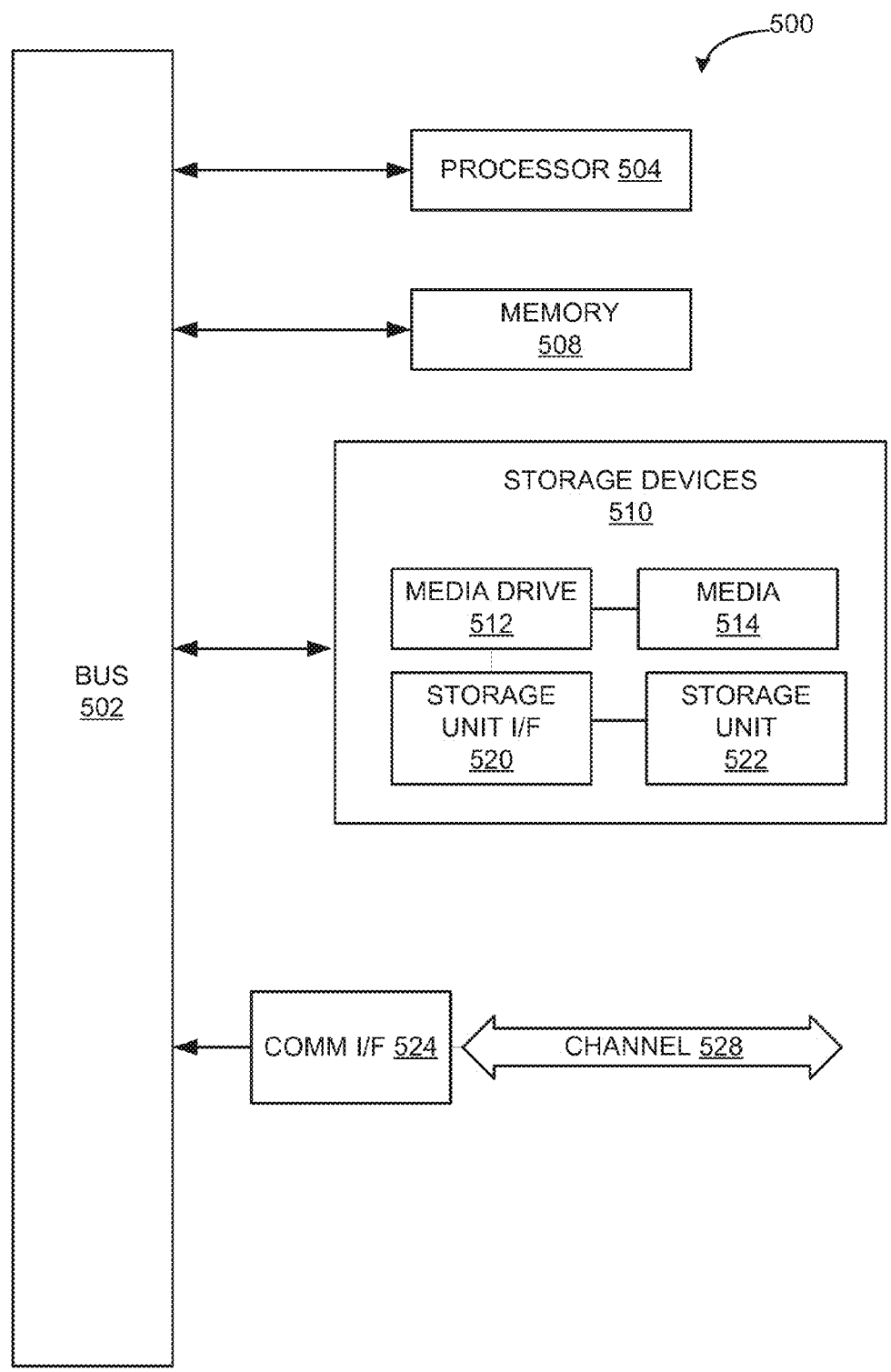
FIG. 5 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the application using other computing modules or architectures.

Referring now to FIG. 5, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

What is claimed is:

1. A computer-implemented method of commenting digital content dynamically, comprising:
   receiving a request to create a comment to a digital content from a user, the request comprising a comment entry entered by the user via a graphical interface of a learning system;
   determining a context related to the digital content by collecting context information comprising a course, a section, an assignment, an instructor, or a student;
   determining a subset of comments by searching a comment library based on the comment entry and the context;
   determining a set of comment selections by applying a searching filter to the determined subset of comments, the set of comment selections comprising individual comment selections;
   presenting the set of comment selections to the user within the graphical interface of the learning system; and
   replacing the user comment entry with a user input corresponding to a comment selection within the set of comment selections presented to the user;
   providing and adjusting the set of comment searching filters based on the context, wherein the step of searching the library comprises searching the comment library according to the set of comment searching filters; and
   monitoring the comment entry entered by the user;
   wherein the digital content is a document received from a second user.

2. The computer-implemented method of claim 1, further comprising storing the comment entry in a second comment library.

3. The computer-implemented method of claim 1, further comprising storing metadata associated with the comment entry.

4. The computer-implemented method of claim 1, wherein the step of determining the set of comment selections comprises searching a keyword or a full text match corresponding to the comment entry within the comment library.

5. The computer-implemented method of claim 1, further comprising determining a second set of comment selections upon determining the comment entry is a predetermined input.

6. A computer-implemented method of commenting digital content dynamically, comprising:
   receiving a request to create a comment to a digital content from a user, the request comprising a comment entry entered by the user via a graphical interface of a learning system;
   determining a context related to the digital content by collecting context information comprising a course, a section, an assignment, an instructor, or a student;
   determining a subset of comments by searching a comment library based on the comment entry and the context;
   determining a set of comment selections by applying a searching filter to the determined subset of comments, the set of comment selections comprising individual comment selections;
   presenting the set of comment selections to the user within the graphical interface of the learning system;
   providing and adjusting the set of comment searching filters based on the context, wherein the step of searching the library comprises searching the comment library according to the set of comment searching filters;
   replacing the user comment entry with a user input corresponding to a comment selection within the set of comment selections presented to the user; and
   associating the comment entry corresponding to the comment selection with the digital content and displaying the digital content along with the comment entry;
   wherein the digital content is a document received from a second user.

7. The computer readable medium of claim 6, wherein the computer executable program code is further configured to cause the computing device to store the comment entry in a second comment library.

8. The computer readable medium of claim 6, wherein the computer executable program code is further configured to cause the computing device to store metadata associated with the comment entry.

9. The computer readable medium of claim 6, wherein the computer executable program code is further configured to cause the computing device to provide and adjust the set of comment searching filters based on the context, wherein the step of searching the library comprises searching the comment library according to the set of comment searching filters.

10. The computer readable medium of claim 6, wherein the computer executable program code is further configured to cause the computing device to monitor the comment entry entered by the user.

11. The computer readable medium of claim 10, wherein the computer executable program code is further configured to cause the computing device to search a keyword or a full text match corresponding to the comment entry within the comment library when determining the set of comment selections.

12. The computer readable medium of claim 10, wherein the computer executable program code is further configured to cause the computing device to determine a second set of comment selections upon determining the comment entry is a predetermined input.

13. The computer readable medium of claim 6, wherein the computer executable program code is further configured to cause the computing device to associate the comment entry corresponding to the comment selection with the digital content and display the digital content along with the comment entry.

\* \* \* \* \*